(12) United States Patent
Park

(10) Patent No.: US 7,781,706 B2
(45) Date of Patent: Aug. 24, 2010

(54) CONDUCTIVE COMPOSITION FOR PRODUCING CARBON FLEXIBLE HEATING STRUCTURE, CARBON FLEXIBLE HEATING STRUCTURE USING THE SAME, AND MANUFACTURING METHOD THEREOF

(75) Inventor: Sanggu Park, Seoul (KR)

(73) Assignee: Centech Co., Ltd., Hwaseong-si (KR)

( * ) Notice: Subject to any disclaimer, the term of this patent is extended or adjusted under 35 U.S.C. 154(b) by 612 days.

(21) Appl. No.: 10/599,379

(22) PCT Filed: Mar. 29, 2005

(86) PCT No.: PCT/KR2006/000914

§ 371 (c)(1),
(2), (4) Date: Sep. 27, 2006

(87) PCT Pub. No.: WO2006/004282

PCT Pub. Date: Jan. 12, 2006

(65) Prior Publication Data

US 2008/0251510 A1    Oct. 16, 2008

(30) Foreign Application Priority Data

Mar. 29, 2004  (KR) ............... 10-2004-0021056
Apr. 23, 2004  (KR) ............... 10-2004-0028299

(51) Int. Cl.
*H05B 3/34* (2006.01)
*H01B 1/22* (2006.01)

(52) U.S. Cl. .................................. 219/528

(58) Field of Classification Search ............ 219/528, 219/552–3; 252/510, 511; 524/495–496
See application file for complete search history.

(56) References Cited

U.S. PATENT DOCUMENTS

| | | | |
|---|---|---|---|
| 4,695,508 A | | 9/1987 | Kageyama et al. |
| 5,082,595 A | * | 1/1992 | Glackin ............ 252/511 |
| 2003/0116757 A1 | | 6/2003 | Miyoshi et al. |

FOREIGN PATENT DOCUMENTS

| | | |
|---|---|---|
| JP | 4-011658 A | 1/1992 |
| JP | 4-304266 A | 10/1992 |
| JP | 6-306289 A | 11/1994 |

* cited by examiner

*Primary Examiner*—Shawntina Fuqua
(74) *Attorney, Agent, or Firm*—Sughrue Mion, PLLC

(57) ABSTRACT

Provided is a conductive composition formed of a mixture of liquid silicone rubber and conductive carbon black wherein a weight ratio between the liquid silicon rubber and the conductive carbon black is 100:1-15, or a conductive composition formed of a mixture of liquid silicon rubber and graphite powder wherein a weight ratio between the liquid silicon rubber and the graphite powder is 100:10-150. A carbon flexible heating structure is manufactured by mixing a conductive composition formed of liquid silicon rubber and a filler, agitating a mixture of the liquid silicon rubber and conductive carbon black by adding a diluent at a rate of 1-100% with respect to the weight of the liquid silicon rubber, and molding the mixture into a particular shape and curing the molded mixture.

5 Claims, 3 Drawing Sheets

[Fig. 1]
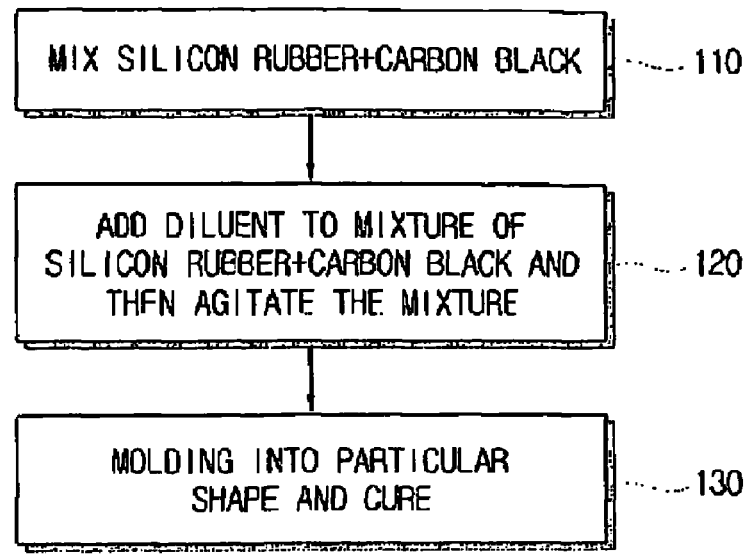
[Fig. 2]
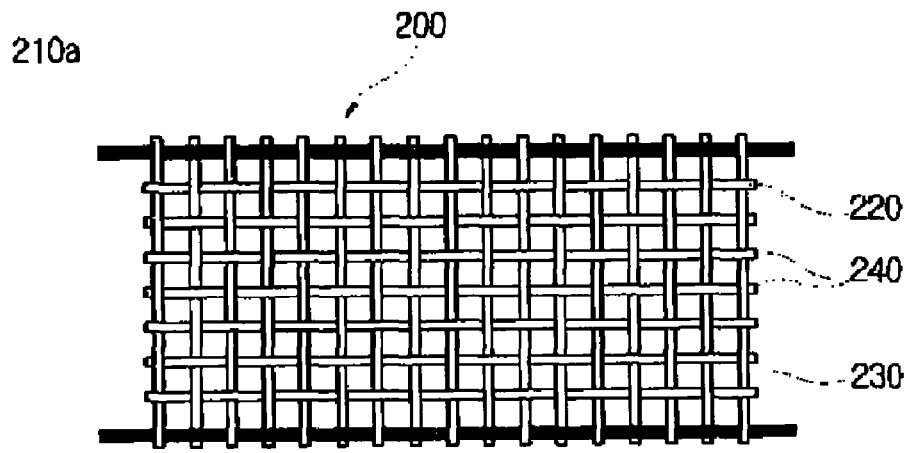
[Fig. 3]
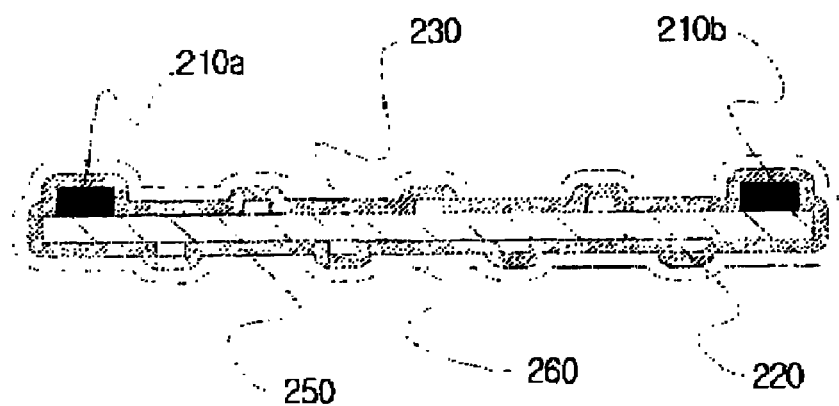

[Fig. 4]
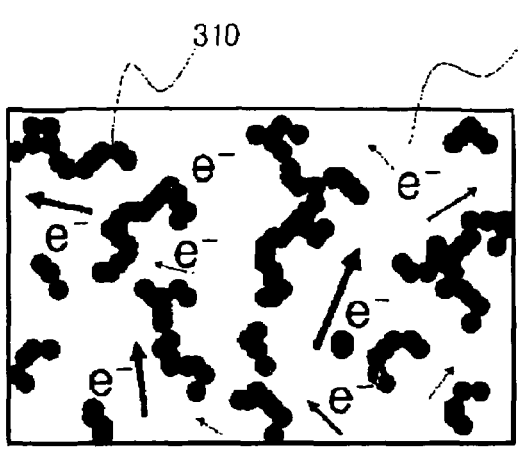
[Fig. 5]
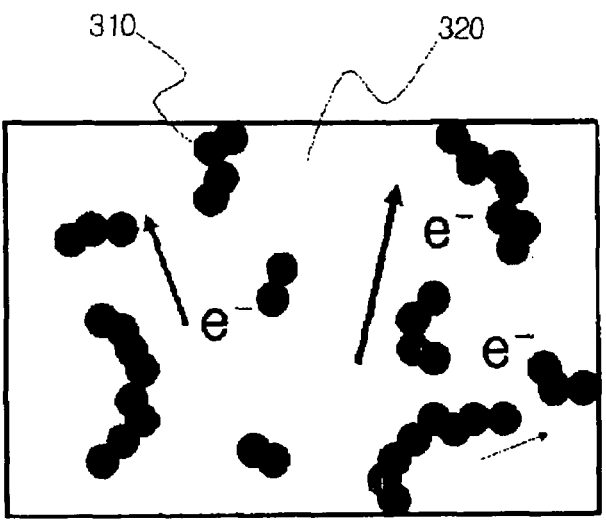
[Fig. 6]
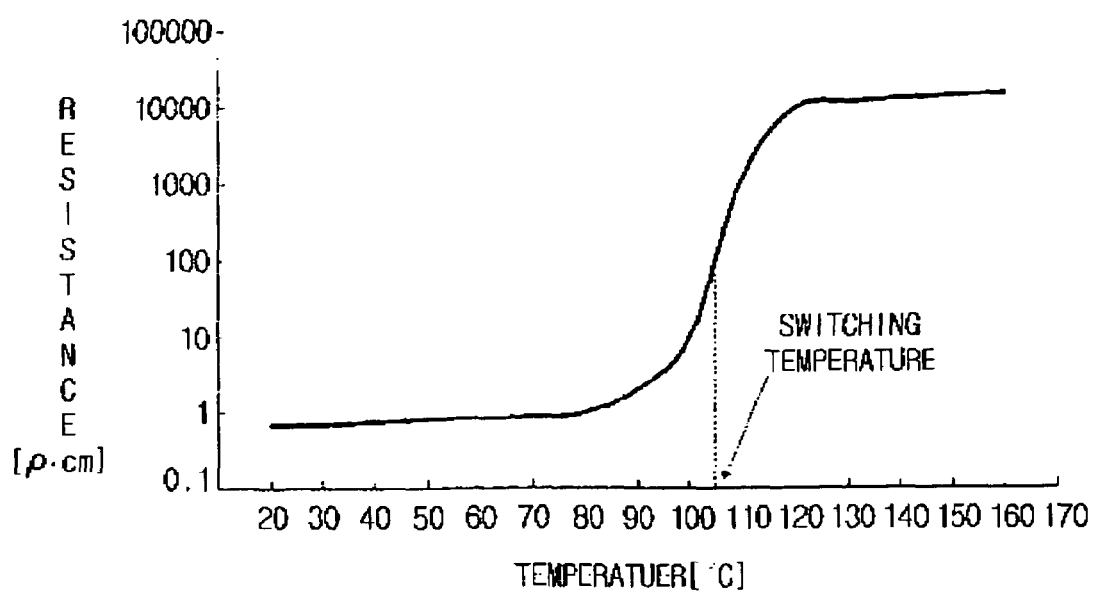

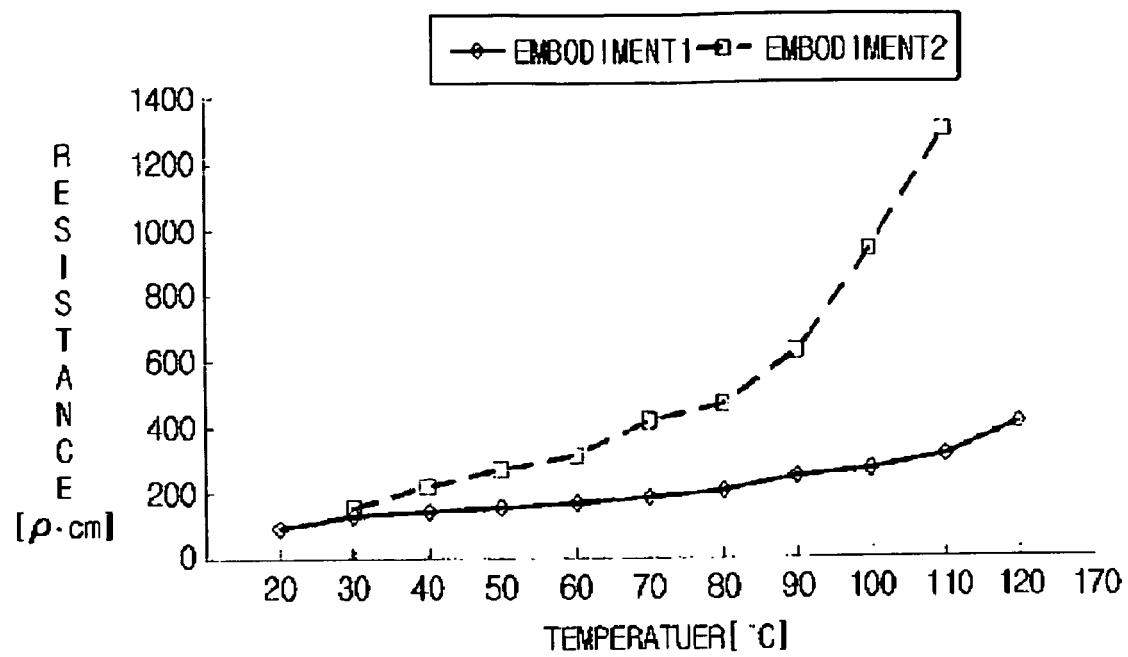
[Fig. 7]

CONDUCTIVE COMPOSITION FOR PRODUCING CARBON FLEXIBLE HEATING STRUCTURE, CARBON FLEXIBLE HEATING STRUCTURE USING THE SAME, AND MANUFACTURING METHOD THEREOF

This is a national stage application under 35 U.S.C. 371 of PCT/KR2005/000914 filed on Mar. 29, 2005, which claims priority from Korean patent application 10-2004-0021056 filed on Mar. 29, 2004, and Korean patent application 10-2004-0028299 filed on Apr. 23, 2004, all of which are incorporated herein by reference.

TECHNICAL FIELD

The present invention relates to a conductive composition in which the weight ratio between liquid silicone rubber and conductive carbon black is 100:1-15, a carbon flexible heating structure which is obtained by molding the conductive composition in a particular shape or by coating the conductive composition on a mold having a particular shape, and a method of manufacturing the carbon flexible heating structure.

BACKGROUND ART

The importance of electrically conductive polymer as one of fields of functional polymer has been gradually increased. By providing electrical conductivity to a polymer material, the polymer material obtains useful physical and chemical properties and not only a functionally superior material, but also a cheap material in view of production costs can be obtained.

In general, a number of polymer materials have been regarded as highly insulating materials. Although the polymer materials work well as electrically insulating materials due to a low conductivity, they function as electrical conductors when a filler such as carbon black, carbon fiber, or metal powder is added.

The added filler forms an electrical path in the polymer material which works as a passage of electrons so that the polymer material becomes an electrical conductor. When the temperature increases, the interval between filler particles in semicrystalline polymer including the conductive filler increases due to a thermal expansion in a melting area of the polymer so that the flow of electrons is disturbed.

Carbon black and carbon fiber are mainly used as the conductive filler added to provide a positive temperature coefficient (PTC) function to the polymer. Crystalline polymer such as polyethylene is mainly used as the polymer material.

Accordingly, as the temperature increases, the resistance of the polymer material is suddenly increased greatly, which is referred to as a static characteristic temperature coefficient or a PTC phenomenon. That is, while resistance is relatively low at a low temperature, when the temperature reaches a predetermined degree, the resistance increases suddenly so that current is difficult to flow. The temperature at which the above sudden change occurs is referred to as a switching temperature or Curie temperature.

The switching temperature is defined as a temperature corresponding to double the minimum resistance value or a resistance value at a reference temperature (25° C.) and is a major parameter in the property of the material.

Also, changing the component of the material makes the switching temperature move toward a high temperature or a low temperature so that the material can be used for a variety of devices. For example, the material can be used for a temperature sensor or overheat protection using a resistance-temperature property, a heater using a current-voltage property, or a delay circuit or a demagnetic circuit using a current attenuation property.

Of the above application fields, in the case of being used to prevent a damage to a product or an electronic circuit due to overheat or the flow of over-current, the PTC using polymer can greatly perform both protection functions with respect to overheat and overload.

For a fuse used as an overload protection, although it has a superior protection function with respect to over-current, when current is discontinued as the fuse is cut off due to the over-current, the fuse needs to be replaced, so it is inconvenient. For a bimetal switch which provides a superior temperature protection function and a restoring function, since it is not sensitive to over-charges, it is difficult to use the bimetal switch for a precise electronic circuit. Thus, it can be seen that the PTC using polymer has a superior property compared to the above members.

The polymer PTC material can be used as a superior PTC material by compensating for drawbacks of a conventional ceramic PTC such as a low conductivity, high process costs, and a fixed shape. In particular, since the minimum resistance is quite small and a manufacturing shape is free, the polymer PTC material has already been widely used in designing small devices and the use thereof is fast increasing. The temperature of the polymer PTC decreases after heat or current is cut off. Also, the PTC material has a function of automatically restoring without being replaced when the over-current is removed.

In addition to the above properties of the PTC, a negative temperature coefficient (NTC) phenomenon occurs in which resistance decreases greatly when a new conductivity network is formed as the dispersion state of conductive particles in a melting state of polymer changes.

Since the property provided to the conductive polymer by the PTC effect can be lost by the NTC phenomenon, the NTC phenomenon becomes a great hindrance to the PTC phenomenon.

The NTC phenomenon occurs when the conductive particles are moved by cross-linking in a melting state so that a new structure is formed. The cross-linking forms a network to allow the conductive particles to strongly attract to each other and restrict motion of the conductive particles so that a structural stability can be obtained.

The polymer PTC material is used to prevent damage to electronic products or electronic circuits and has already been used in designing small devices because the manufacturing shape thereof is free. However, since a cross-linker is added to restrict the NTC phenomenon and then the polymer PTC material is cured so that it has a hard plastic structure, the polymer PTC material has a limit in the process and purpose thereof when being used for a general heating body.

In the semicrystalline polymer including a conductive filler, as the temperature increases, since the interval between filler particles in the polymer increases accordingly due to thermal expansion in the switching temperature area, an amplitude between thermal contraction and thermal expansion that repeat, continuously occurs up to a crystalline melting point so that the life span of products are shortened.

DISCLOSURE OF INVENTION

Technical Problem

To solve the above and/or other problems, the present invention provides a carbon flexible heating structure having superior physical and chemical properties such as heat resistance, winter-hardiness, ozone resistance, electricity insulation, and flexibility, a conductive composition used therefor, and a method of manufacturing the carbon flexible heating structure.

The present invention provides a method of manufacturing the carbon flexible heating structure which can reduce manufacturing costs by simplifying a manufacturing process.

The present invention provides a carbon flexible heating structure in which a phenomenon of peeling off of the structure does not occur even when a periodic change between thermal expansion and thermal contraction repeats, by mixing and agitating only a diluent and liquid silicone rubber that is the same material as the conductive composition and coating the mixture on a surface of the carbon flexible heating structure, as necessary, for insulation.

The present invention provides a carbon flexible heating structure which can be used in a variety of fields by making a frame mold into a variety of shapes such as a mesh shape, a plate shape, a rod shape, a ring shape, or a bar shape during the manufacturing of the carbon flexible heating structure.

Technical Solution

According to an aspect of the present invention, a conductive composition formed of a mixture of liquid silicone rubber and conductive carbon black or liquid silicone rubber and graphite powder wherein weight ratios between the liquid silicone rubber and the conductive carbon black and the liquid silicone rubber and the graphite powder are 100:1-15 and 100:10-150, respectively.

The thermal expansion coefficient of the liquid silicone rubber is $200 \times 10^{-6} \cdot K^{-1}$ through $300 \times 10^{-6} \cdot K^{-1}$.

The size of a particle of the conductive carbon black is 20 through 40 nm and the amount of absorption of dibutyl phthalate (DBP) is 300 through 50 ml/100 g. The size of a particle of the graphite powder is 1 through 10 μm and electrical resistance is 0.0005 through 0.08 Ω·cm.

A method of manufacturing a carbon flexible heating structure comprises mixing a conductive composition formed of liquid silicone rubber and a filler, agitating a mixture of the liquid silicone rubber and conductive carbon black by adding a diluent at a rate of 1-100% with respect to the weight of the liquid silicone rubber, and molding the mixture into a particular shape and curing the molded mixture.

ADVANTAGEOUS EFFECTS

As described above, the carbon flexible heating structure according to the present invention and a conductive composition for manufacturing the same have superior physical and chemical properties such as heat resistance, winter-hardiness, ozone resistance, and electricity insulation, and have a self-control resistance heating function and superior flexibility, so that the number of application fields of the carbon flexible heating structure according to the present invention are drastically increased.

The carbon flexible heating structure according to the present invention can provide an economic manufacturing method by simplifying the manufacturing steps to lower the manufacturing costs.

In the carbon flexible heating structure according to the present invention, a phenomenon of peeling off of the structure does not occur even when a periodic change between thermal expansion and thermal contraction repeats, by mixing and agitating only a diluent and liquid silicone rubber that is the same material as the conductive composition and coating the mixture on a surface of the carbon flexible heating structure, as necessary, for insulation.

When manufactured, the carbon flexible heating structure may be used in a variety of fields by molding the structure into a variety of shapes in the step of molding or by making a frame mold into a variety of shapes such as a mesh shape, a plate shape, a rod shape, a ring shape, or a bar shape.

BRIEF DESCRIPTION OF THE DRAWINGS

FIG. 1 is a flow chart for explaining a manufacturing process of a carbon flexible heating structure according to an embodiment of the present invention;

FIG. 2 is a plan view illustrating a structure of a carbon flexible heating mesh according to an embodiment of the present invention;

FIG. 3 is a cross-sectional view illustrating a fine structure of carbon flexible heating mesh of FIG. 2;

FIG. 4 is a view illustrating a fine structure of a conductive composition according to an embodiment of the present invention;

FIG. 5 is a view illustrating a fine structure of the conductive composition shown in FIG. 4 in a state in which the temperature is higher than room temperature;

FIG. 6 is a graph showing a temperature-resistance property of a conventional PTC device; and FIG. 7 is a graph showing a temperature-resistance property of the carbon flexible heating structure of FIG. 1.

BEST MODE FOR CARRYING OUT THE INVENTION

With reference to the accompanying drawings, an embodiment of the present invention will be described in detail with respect to a case in which a carbon flexible heating structure using a conductive composition obtained by mixing liquid silicone rubber and conductive carbon black is molded in the form of a mesh.

FIG. 1 is a flow chart for explaining a manufacturing process of a carbon flexible heating structure according to an embodiment of the present invention. Referring to FIG. 1, the manufacturing process includes mixing liquid silicone rubber and conductive carbon black (Operation 110), agitating by adding a diluent to a mixture of liquid silicone rubber and conductive carbon black (Operation 120), and molding and curing by pasting or coating the mixture on a structure having a particular shape (Operation 130).

In the mixing operation 110, liquid silicone rubber and conductive carbon black are mixed at a mixture ratio of about 100:1-15 based on a weight ratio thereof. Next, in the agitating operation 120, a diluent is added to the mixture of liquid silicone rubber and conductive carbon black and the mixture is agitated. Toluene or xylene is mainly used as the diluent. The diluent added to the mixture in the agitating operation 120 is preferably within a range of about 0-100% with respect to the weight ratio of the liquid silicone rubber. In the agitating operation 120, when the content of carbon black is small, flexibility of the conductive composition is obtained without adding the diluent. However, since the flexibility is deteriorated as the content of carbon black increases, the flexibility of the conductive composition is improved by adding the diluent and agitating the mixture. The conductive composition underwent the mixing operation 110 and the agitating operation 120 undergoes the molding and curing operation 130 so that a carbon flexible heating structure befitting a desired use is obtained.

The conductive composition that is the agitated mixture is molded into a particular shape and then cured, or pasted or coated on a mold having a particular shape and then cured. A structure having a variety of shapes such as a mesh shape, a plate shape, a rod shape, a ring shape, or a bar shape may be used as the particular shape or the mold having a particular shape.

Table 1 below shows curing time after the conductive composition is coated on the mold having a particular shape.

TABLE 1

| Curing Temperature | Curing Time |
| --- | --- |
| Room Temperature | 4 days~1 week |
| 150° C. | 5~10 minutes |
| 250° C. | 1~5 minutes |

Referring to Table 1, when the conductive composition is cured, a curing time of 4-7 days is needed at room temperature, which can be reduced to 1-5 minutes at a temperature of 200° C.

Table 2 below shows a thermal property of polyethylene and liquid silicone rubber according to the present invention. Table 3 below shows the life span of use of the silicone rubber according to a temperature.

The liquid silicone rubber is used for the conductive composition because it exhibits superior heat resistance, winter-hardiness, ozone resistance, electricity insulation, and flexibility. As shown in Table 2, since the thermal expansion coefficient of the liquid silicone rubber that is $270 \times 10^{-6} \cdot K^{-1}$ is higher, by about two times, than that of polyethylene that is $150 \times 10^{-6} \cdot K^{-1}$, the carbon flexible heating structure has a self-control resistance heating function.

TABLE 2

| Item | Liquid silicon Rubber | Polyethylene (HDPE) |
| --- | --- | --- |
| Specific Gravity | 1.04 | 0.94~0.97 |
| Glass Transition Temperature (Tg) | −118~−132° C. | −30° C. |
| Crystal Melting Temperature (Tm) | — | 137° C. |
| Thermal Expansion Coefficient ($10^{-6}/k^{-1}$) | 270 | 150 |
| Continuous Use Temperature | 190° C. | 80~90° C. |

TABLE 3

| Temperature Range | Expected Life-Span of Use |
| --- | --- |
| −50~−30° C. | 10 years or more |
| −30~150° C. | semi-permanent (20 years or more) |
| 150~200° C. | 5~10 years |
| 200~250° C. | 1~2 years |
| 250~300° C. | 1~2 months |
| 300~400° C. | several weeks to several months |

Since the carbon flexible heating structure according to the present invention uses the liquid silicone rubber, it exhibits a superior flexibility so that the application fields of the carbon flexible heating mesh according to the present invention drastically increase. Also, silicone rubber can be used over 20 years or semi-permanently according to a range of temperature in which the silicone rubber is used.

Table 4 below shows typical properties of the conductive carbon black according to the present invention.

TABLE 4

| Item | Air Space Rate (%) | Primary Particle Diameter (nm) | Number of Primary Particle (×$10^{15}$ piece/g) |
| --- | --- | --- | --- |
| Conductive Carbon Black | 60 | 40 | 38 |

It is the typical properties of the conductive carbon black that the size of a particle is 40 nanometers, a porosity is 60%, and the number of particles is $38 \times 10^{15}$ per gram. This means that the conductive carbon black has a high conductive structure in which the absorption amount of dibutyl phthalate (DBP) is between 300-500 ml/100 g.

FIG. 2 illustrates a structure of a mesh type of a carbon flexible heating structure according to an embodiment of the present invention (hereinafter, referred to as the "carbon flexible heating mesh"). FIG. 3 is a cross-sectional view the carbon flexible heating mesh of FIG. 2.

A carbon flexible heating mesh 200 is a fabric made of a woof 230 and a warp 220. Port portions 210a and 210b are formed longer than the woof 230 and the warp 220 of the fabric as ports to supply electric power to both end portions of the woof 230 or the warp 220. The port portions 210a and 210b are formed of a conductive metal wire exhibiting superior conductivity and a tin-plated copper wire or a silver wire exhibiting superior conductivity are used as the conductive metal wire. A conductive composition 250 is preferably coated or pasted on a frame structure 240 to a thickness of 0.05 through 0.15 mm.

Meanwhile, a mixture obtained by mixing liquid silicone rubber and a diluent only and agitating the same can be coated on a surface of the carbon flexible heating mesh 200, as necessary, for insulation. Since an insulation coating 260 is formed of the liquid silicone rubber that is the same material as the conductive composition 250, even when there is a periodic change between thermal expansion and thermal contraction that repeatedly occur, a peeling-off phenomenon of the mesh 200 does not occur.

Next, the self-control resistance heating mechanism will be described in detail with reference to FIGS. 4 and 5.

FIG. 4 is a view illustrating a fine structure of a conductive composition according to an embodiment of the present invention at room temperature. FIG. 5 is a view illustrating a fine structure of the conductive composition shown in FIG. 4 in a state in which the temperature is higher than the room temperature. FIGS. 4 and 5 show a degree of orientation of a conductive carbon black 310 in a liquid silicone rubber 320.

Particles of the conductive carbon black 310 are distributed with a narrow gap which is filled with the liquid silicone rubber 320. The narrow gap works as a potential barrier and electrons are tunneled though the narrow gap by thermal fluctuation so that electrical conductivity is exerted.

The self-control resistance heating function according to the present invention uses tunneling current as described above. The tunneling current flows through the narrow gap when the narrow gap made of the silicone rubber 320 is maintained to be 1 nm or less and is very sensitive to a distance so that it changes in inverse proportion and exponentially with respect to a change in the distance.

When the temperature increases, as shown in FIG. 5, the narrow gap filled with the silicone rubber 320 increases so that electrical conductivity is lowered. Thus, a resistance value rises so that the narrow gap works as an electrical insulator.

An embodiment of the carbon flexible heating structure operating as above is described in detail with reference to FIGS. 6 and 7. FIG. 6 is a graph showing a temperature-resistance property of a conventional PTC device. FIG. 7 is a graph showing a temperature-resistance property of the carbon flexible heating structure according to an embodiment of the present invention.

Referring to FIGS. 6 and 7, a carbon flexible heating mesh test sample including a content of carbon black 10% and a carbon flexible heating mesh test sample including a content of carbon black 8% are used in Embodiment 1 and Embodiment 2, respectively. A temperature-resistance property is measured for each embodiment and the results of measurements are shown below in Table 5.

TABLE 5

| Temperature (° C.) | Resistance rate ($\rho \cdot cm$) | |
| --- | --- | --- |
|  | Embodiment 1 | Embodiment 2 |
| 20 | 91 | — |
| 30 | 129 | 150 |
| 40 | 144 | 220 |
| 50 | 156 | 267 |
| 60 | 170 | 312 |
| 70 | 187 | 416 |
| 80 | 208 | 468 |
| 90 | 250 | 625 |
| 100 | 267 | 939 |
| 110 | 312 | 130 |
| 120 | 407 |  |

FIG. 7 shows a temperature-resistance characteristic curve of a general polymer PTC device as a comparative example. As shown in FIG. 6, the temperature-resistance characteristic curve of the conventional PTC device shows that the heat temperature of the PTC device is determined by a crystalline melting temperature Tm of each polymer material and that the resistance rate no longer increases at a particular temperature after passing the switching temperature.

However, as shown in FIG. 7, the carbon flexible heating mesh according to the present invention, unlike the conventional PTC device, exhibits a self-control resistance heating property, that is, the resistance rate gradually increases as the temperature increases.

In another embodiment, graphite powder can be used instead of the conductive carbon black. When the graphite powder is used as the filler, since graphite have a superior lubricity to the conductive carbon black, the graphite powder can be easily mixed with the liquid silicone rubber.

It is preferred that the weight ratio between the liquid silicone rubber and the graphite powder is 100:10-150 in a conductive composition made of a mixture of the liquid silicone rubber and the graphite powder. The average particle size of graphite powder is 1-10 μm and electrical resistance is 0.0005-0.08 Ω·cm.

A short staple can be used as a reinforcing material for the conductive composition obtained by mixing the liquid silicone rubber and the conductive carbon black or graphite powder as the filler. The short staple may be glass fiber, carbon fiber, or graphite fiber having a diameter of 1 through 50 μm. By adding the short staple, not only the liquid conductive composition can be reinforced, but also molding the conductive composition into a desired shape without the frame structure is made easy.

The conductive composition and the carbon flexible heating structure according to the present invention can be applied to the fields of a temperature sensor, a temperature compensation device, protection against overheat, a heater, and an electric circuit for protection of over-current and are not limited to the above-described embodiments.

The foregoing embodiments are merely exemplary and are not to be construed as limiting the present invention. The description of the present invention is intended to be illustrative, and not to limit the scope of the claims. Many alternatives, modifications, and variations will be apparent to those skilled in the art.

The invention claimed is:

1. A carbon flexible heating structure formed by molding a conductive composition obtained by mixing liquid silicone rubber and carbon black at a weight rate in a range of 100:1~15 into a particular shape and curing a mixture,
    wherein the carbon flexible heating structure has the shape of a mesh, and
    wherein the mesh is a fabric made of a woof and a warp and has port portions formed longer than the woof or the warp of the fabric, and the port portions are formed of a conductive metal wire having superior conductivity.

2. The carbon flexible heating structure of claim 1, wherein the port portions are tin-plated copper wires or silver wires.

3. A carbon flexible heating structure formed by molding a conductive composition obtained by mixing liquid silicone rubber and graphite powder at a weight rate in a range of 100:10-150 into a particular shape and curing a mixture,
    wherein the carbon flexible heating structure has the shape of a mesh, and
    wherein the mesh is a fabric made of a woof and a warp and has port portions formed longer than the woof or the warp of the fabric, and the port portions are formed of a conductive metal wire having superior conductivity.

4. The carbon flexible heating structure of claim 3, wherein the port portions are tin-plated copper wires or silver wires.

5. A carbon flexible heating structure formed by molding a conductive composition obtained by mixing liquid silicone rubber and graphite powder at a weight rate in a range of 100:10-150 into a particular shape and curing a mixture,
    wherein insulation coating formed of an insulating mixture obtained by mixing liquid silicone rubber and a diluent and agitating a mixture is provided on a surface of the carbon flexible heating structure.

* * * * *